United States Patent [19]

Hofmann et al.

[11] 4,244,641

[45] Jan. 13, 1981

[54] MICROFILM READER

[75] Inventors: Wilfried Hofmann; Guenther Lueder, both of Taufkirchen; Peter Nassl, Gauting; Peter Puechler, Munich; John Krueger, Munich; Walter Rauffer, Munich; Herbert Lusch, Taufkirchen, all of Fed. Rep. of Germany

[73] Assignee: AGFA-Gevaert, A.G., Leverkusen, Fed. Rep. of Germany

[21] Appl. No.: 817,730

[22] Filed: Jul. 21, 1977

[30] Foreign Application Priority Data

Jul. 22, 1976 [DE] Fed. Rep. of Germany ....... 2632934
Nov. 30, 1976 [DE] Fed. Rep. of Germany ....... 2654320

[51] Int. Cl.² .......................... G03B 23/08; G03B 1/48
[52] U.S. Cl. .................................... 353/27 R; 353/96; 353/101
[58] Field of Search .................... 353/27 R, 27 A, 24, 353/96, 100, 101; 350/241, 247, 255

[56] References Cited

U.S. PATENT DOCUMENTS

| 3,634,005 | 1/1972 | Peters | 353/27 R |
| 3,718,391 | 2/1973 | Pfeifer et al. | 353/27 R |
| 3,792,923 | 2/1974 | Pfeifer et al. | 353/27 R |
| 3,917,389 | 11/1975 | Shoji | 353/27 R |
| 4,025,175 | 5/1977 | Leibundgut et al. | 353/27 R |
| 4,067,648 | 1/1978 | Spreitzer | 353/27 R |

Primary Examiner—Steven L. Stephan

[57] ABSTRACT

A microfilm reader for enlarged projections of any desired micropicture among a number of such pictures on a microfilm. The microfilm is interleaved between two movable plates. A slidable support for the image forming objective is pressed with a tensioned spring against the upper plate. The slidable support can be connected to a slide lever for effecting its placement in proper position. Two arms of a spring can be employed for mounting the slidable support and for tilting it around an axis essentially parallel to the cover plate.

2 Claims, 4 Drawing Figures

MICROFILM READER

BACKGROUND OF THE INVENTION

This invention relates to an improved microfilm reader for providing enlarged projections of any micropicture selected and provided with a simple adjustment and focussing mechanism.

In many microfilm readers of the type considered here it is relatively difficult to get access to the image forming objective of the apparatus. This is caused in general by the conventional mounting immediately above the image forming objective of a deflection mirror for changing the direction of the projection beam coming from the image forming objective. The resulting inaccessibility of the image forming objective makes an adjustment of the image forming objective cumbersome and time consuming for the user.

SUMMARY OF THE INVENTION

1. Purpose of the Invention.

It is an object of the invention to provide a microfilm reader wherein the image forming objective is relatively easily accessible to the user.

It is another object of the invention to provide a simple means for mounting and exchanging the image forming objective. It is another object of the invention to make it possible for the user to simple slide the objective into an easily accessible position.

It is a further object of the invention to provide a simple arrangement which prevents undesired displacement of the microfilm support caused by unintentional touching thereof, or slanted positioning of the apparatus or a supporting of the apparatus in such a way that it is subject to vibrations and shock.

These and other objects and advantages of the present invention will become evident from the description which follows.

2. Brief Description of the Invention

A microfilm reader is disclosed providing enlarged projections of a desired microfilm picture from a plurality of pictures present on a microfilm by having a microfilm support movable in two directions and comprising two transparent plates with the microfilm disposed therebetween mounted on a support for the image-forming objective, said support being slidably held against the upper plate by means of a spring. The support is attached to a resilient slider movable with respect to the apparatus frame. A spring is provided pressing the support of the image-forming objective against the transparent cover plate. By lifting of the spring the support can be handled as desired.

The microfilm reader of the present invention generally comprises a microfilm support movable in two directions and having two transparent plates for supporting the microfilm; a slidable support for the image forming objective, which is pressed with a tensioned spring against the upper plate; and a spring slide lever which is movable relative to the microfilm reader and attached to the slidable support. Preferably a stop is provided on the slide lever for placing the slidable support in the operative position. The slidable support may further include two spring arms essentially vertically arranged relative to the cover plate and attached to the slide lever at its carrying end thereby providing a mounting for the slidable support between its arms and for tilting of the support around an axis essentially parallel to the cover plate. In addition a tension spring between reader case and support can be provided which presses the support against the transparent cover plate and which may have a handle attached for uplifting the spring from the slidable support. The tension spring can comprise two arms one of which is attached to the microfilm reader case and the other is braced to the slidable support and protrudes to the outside of the reader case with a handle. Preferably such tension spring is provided on two sides of the support for better retaining same in position. It is preferred that the ends of the spring protrude to the outside of the reader case and that such ends are connected together, possibly forming a saddle bracket.

The invention accordingly consists in the features of construction, combination of elements and arrangement of parts which will be exemplified in the device hereinafter described and of which the scope of application will be indicated in the appended claims.

BRIEF DESCRIPTION OF THE DRAWING

In the accompanying drawing in which are shown several possible embodiments of the invention.

DETAILED DESCRIPTION OF THE PREFERRED EMBODIMENTS

Figure 1:
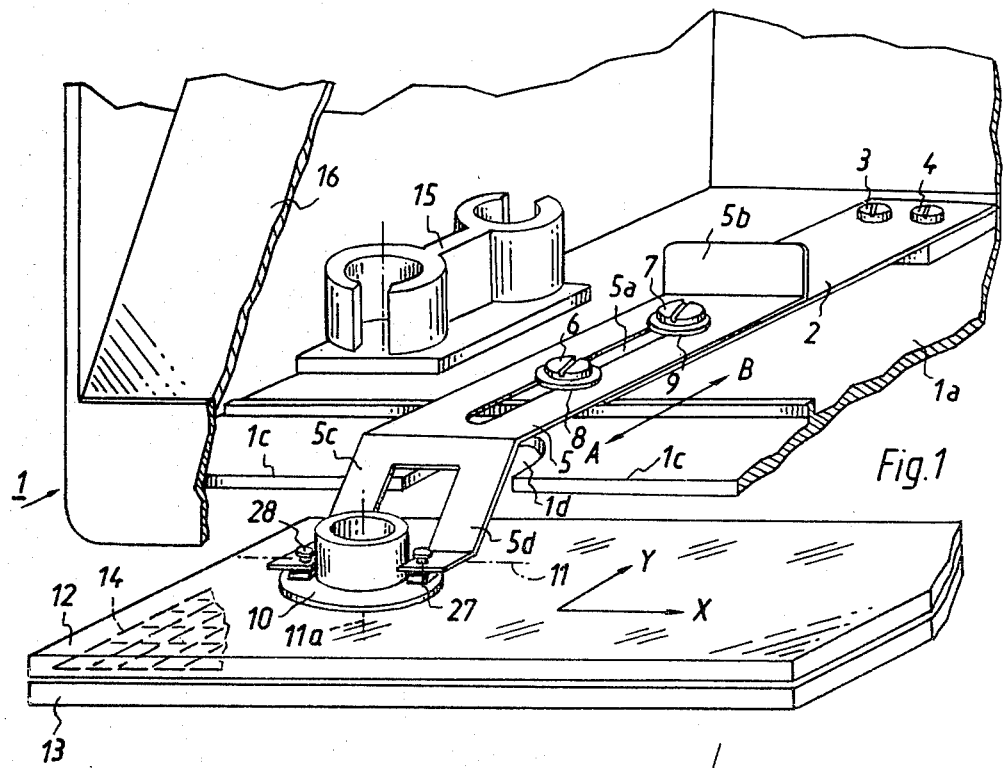
FIG. 1 is a view in perspective of a slider in a microfilm reader with portions cut away for sake of clarity.

Referring now to FIG. 1, a leaf spring 2 is attached to a base plate 1a with screws 3, 4 within the upper part of a microfilm reader with the front part of the leaf spring being capable of vibrating in a vertical direction based on its elasticity. A resilient slider 5 movable in the directions of arrow A-B is connected to the leaf spring 2. The slider has an elongated slot 5a which is guided by two screws 6, 7 attached to leaf spring 2. A spring washer 8 or 9 separates the heads of screw 6 or 7 from the slider 5. The rear end 5b of the slider is bent upwards and provides a handle for moving the slider. The front end of the slider 5 forms two arms 5c and 5d; a support 10 is mounted thereto and tiltable around axis 11. An objective is adapted to be mounted in the support 10. The leaf spring or platen 2 and the slider 5 are pretensioned for pressing the objective support 10 against the upper side of a transparent cover plate 12.

The microfilm is introduced between the cover plate 12 and a similarly transparent base plate 13. This microfilm support 12, 13 is attached in conventional manner to the lower part of the reader, which is not described here, permitting the motion of the support in the x or y direction for selecting the desired microfilm picture. An objective support 15 for interchanging the objectives is shown attached to the base plate 1a. A projection ground glass plate 16 is also shown mounted on the frame of the apparatus.

Figure 2:
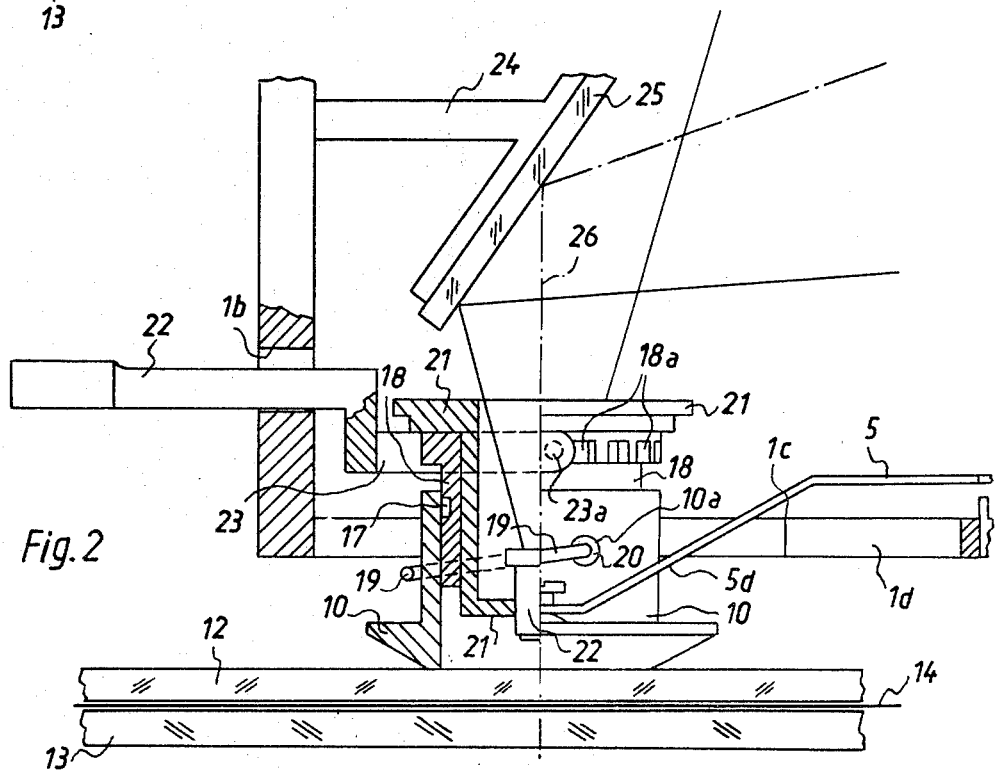
FIG. 2 is a sectional view of a support holding an image forming objective attached to the slider.

FIG. 2 depicts a rotatable body 18 having a threaded nut 17 mounted in the objective support 10. A pin 20 is pressed through a bore 10a in the objective support 10 into the threaded nut 17 by means of a semicircular clamp bracket 19 attached to the objective support 10. Rotation of the rotating body 18 induces a simultaneous linear motion in direction of the rotation axis moving the rotating body 18 into and out of the objective support 10 by varying amounts. A holder 21 carrying the objective lens proper is inserted into the rotating body 18. An adjusting lever 22 is provided for rotating and changing the height of the rotating body 18. The adjusting lever 22 has attached a bow embracing the rotating body 18. Both ends of this bow are formed as journals 23a which mesh into suitable recesses of the rotating body 18. The adjusting lever 22 protrudes through an opening 1b in the upper front part of the apparatus case for easy focussing of the objective by the user. A deflection mirror 25 is attached to the apparatus case by way of a mirror support bracket 24 and arranged above the objective for redirecting the projection beam path 26 to the projection ground glass plate 16 by another additional deflection mirror, which is not shown in the drawing. Two collar screws 27, 28 are fed through corresponding bores in the slider arms 5c and 5d and are threadably mounted to the objective support 10. These two bores are slightly larger in diameter than the diameter of the screws 27, 28 thus providing for possible rotation by about 30° around axis 11 of FIG. 1 for the objective support 10 and therewith for the whole objective body. By means of the attachment to the two resilient arms 5c, 5d the objective support 10 can be rotated additionally by a certain amount around vertical axis 11a which is normal to the axis 11 in the direction Y and against the tension of the resilient force of the two arms 5c, 5d. These two possibilities of rotation of the objective support 10 and its spring induced pressure against the cover plate 12 guarantee in a simple arrangement the exact positioning on the upper side of plate 12 of the lower side of the objective support independent of minor tilting, lifting or lowering movements of the microfilm support system. If the user desires to change objectives or to remove the objective lens from the objective support 10 for cleaning purposes, the user can remove the projection ground glass plate 16 and by hand push the slider 5 with the handle 5b in the direction of arrow B up to the stop. The objective then moves in the opening 1d of the base plate. The objective can be easily removed from the objective support 10 in this position. After replacing the objective lens in the objective support 10 the slider is moved in direction A to the stop provided and the objective lens is again placed in an operative position without any problems.

Figure 3:
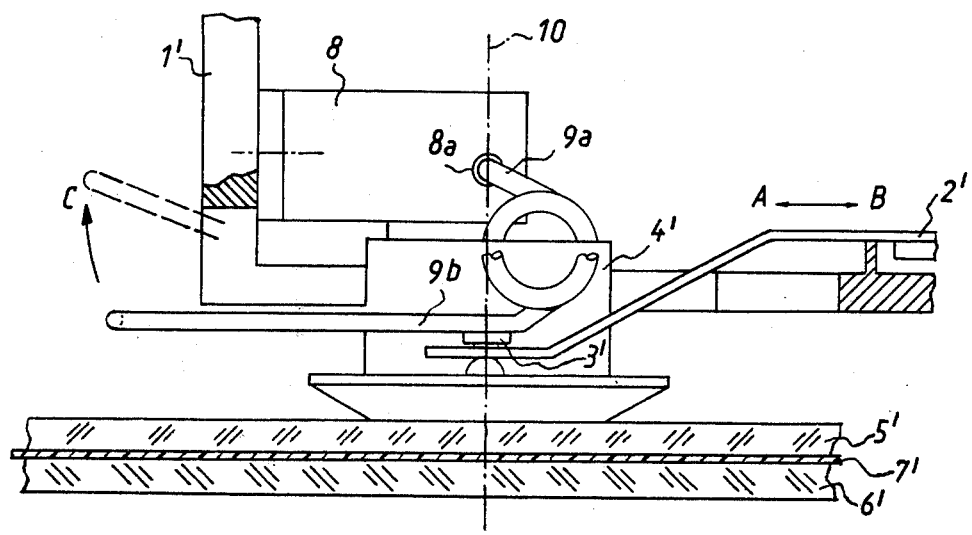
FIG. 3 is a sectional elevation view of a microfilm reader having a lock spring retaining the support of the image forming objective.
Figure 4:
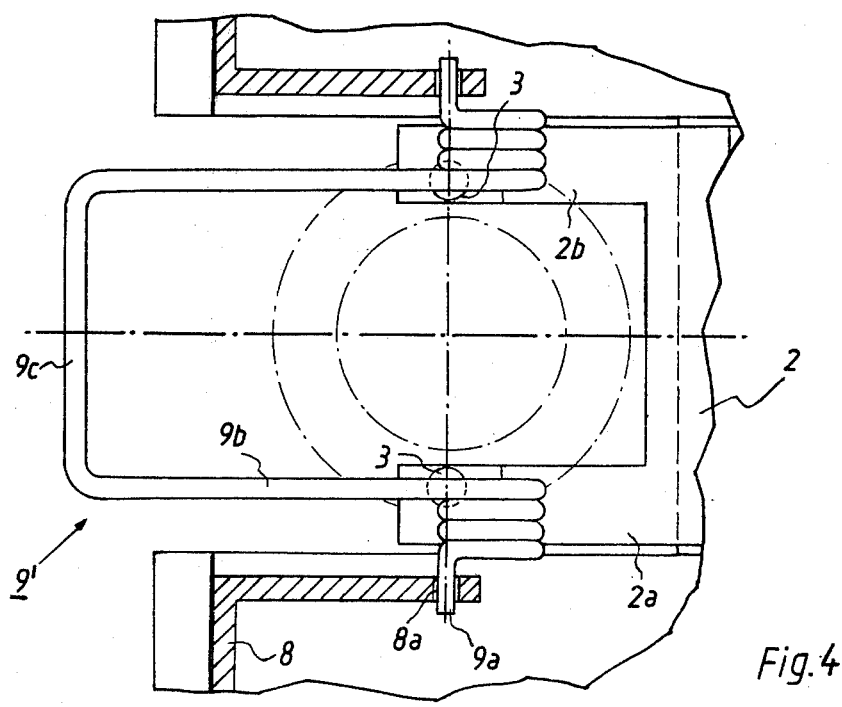
FIG. 4 is a sectional plan view of the microfilm reader of FIG. 3.

In a modified embodiment depicted in FIGS. 3 & 4, there can be provided a spring between the apparatus housing and objective support which presses the objective support against the transparent plate and this spring can have a handle for lifting the spring from the objective support and releasing same. This spring can have two arms, one of which is attached to the reader case and the other one retains the objective support and protrudes from the case for handling. For achieving a uniform pressure of the objective support against the transparent plate there is preferably provided a spring for each of the two sides of the objective support. Preferably the ends protruding from the case are mutually connected for creating a single handle operating both spring arms simultaneously. It is preferred when the two springs form a joint elastic U-shaped bow. In the most simple fashion there is provided an arresting position for the microfilm support. In its normal position the spring provides a pressure on the objective support pressing same against the transparent plate. This creates frictional forces between the objective support and the transparent plate sufficient for preventing displacement of the aligned position of the microfilm support in cases similar to those described above. A leaf spring 2' located at the upper part of the apparatus can be moved in the arrow direction A–B as shown in FIG. 3. The objective support 4' is tiltably attached to the arms 2a, 2b of this leaf spring by means of collar screws 3'. Light pressure of the leaf spring 2' and its own weight presses the objective support 4' with its bottom side against the upper of the two transparent plates 5', 6', holding a microfiche 7'. The rotating body carrying the objective can be placed in the objective support, but this is not shown in FIG. 3 of the drawing. A bow shaped spring 9' has its two ends 9a fixed in two bores 8a located in two brackets mounted to the upper apparatus part 1'. The two arms 9b of the spring 9' press against the heads of the collar screws 3' and this results in pressing the objective support 4' against the transparent plate 5'. This fixes the microfilm support (not shown here in detail), which carries the transparent plates 5',6' which is movable in a plane normal to the projection beam 10', in its position relative to the path of the image beam. The user tilts the saddle bracket 9c protruding from the front side of the apparatus in the direction of arrow C upwards as shown in FIG. 3 for aligning and moving of the microfiche support. This releases the pressure of the spring arm 9b against the objective support 4. Now the objective support is lying on the transparent plate 5 with very little pressure and this permits easy motion of the microfilm support in any desired position.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A microfilm reader for providing enlarged projections via an image forming objective of any desired micropicture selected from a plurality of pictures present on a microfilm comprising in combination, a frame;

a microfilm support movable in at least two directions having an upper and a lower transparent plate for positioning the microfilm;

a support for the image forming objective slidably mounted in said frame for movement along a direction substantially parallel to said transparent plates and biased against the upper one of the two transparent plates;

an image forming objective operatively mounted on said support;

a mirror mounted on said frame above and proximate the said image forming objective;

a spring slide lever movable relative to the microfilm reader and attached to the slidable support and adapted to be positioned into an operative position wherein the image forming objective is in a correct position for projecting a preselected micropicture, said lever has a carrying end and two spring arms arranged in spaced relationship relative to the two plates and extending from the slide lever at its carrying end for mounting the slidable support between said two arms; said two spring arms being biased in a direction normal to said two plates, said image forming objective being tiltable on said two spring arms around an axis essentially parallel to the upper plate.

2. A microfilm reader for providing enlarged projections via an image forming objective of any desired micropicture selected from a plurality of pictures present on a microfilm comprising in combination,
 a frame;
 a microfilm support movable in at least two directions having an upper and a lower transparent plate for positioning the microfilm;
 a support for the image forming objective slidably mounted in said frame for movement along a direction substantially parallel to said transparent plates and biased against the upper one of the two transparent plates;
 an image forming objective operatively mounted on said support;
 a mirror mounted on said frame above and proximate the said image forming objective;
 a spring slide lever movable relative to the microfilm reader and attached to the slidable support and adapted to be positioned into an operative position wherein the image forming objective is in a correct position for projecting a pre-selected micropicture; and including
 at least one coil spring mounted on said frame and normally biased against said support to thereby press the support against the upper one of said two transparent plates;
 and a handle attached to the coil spring for uplifting the spring from the slidable support.

* * * * *